United States Patent [19]

Rolston

[11] 4,238,437
[45] Dec. 9, 1980

[54] METHOD FOR PRODUCING FIBER REINFORCED PRODUCT

[76] Inventor: John A. Rolston, P.O. Box 62, Granville, Ohio 43023

[21] Appl. No.: 930,357

[22] Filed: Aug. 2, 1978

[51] Int. Cl.³ .................... B29C 6/02; B29C 27/00; B29D 23/00
[52] U.S. Cl. .................... 264/102; 264/257; 264/263
[58] Field of Search ............. 264/257, 258, 102, 45.3, 264/263, 272

[56] References Cited

U.S. PATENT DOCUMENTS

| 2,436,984 | 3/1948 | Wilson | 264/263 |
| 2,903,388 | 9/1959 | Jonke et al. | 264/258 |
| 3,263,196 | 7/1966 | Reber | 264/272 |
| 3,388,363 | 6/1968 | Novick | 264/272 |
| 3,413,391 | 11/1968 | Carroll et al. | 264/102 |
| 3,608,052 | 9/1971 | Gunn | 264/137 |
| 3,671,622 | 6/1972 | Humphries | 264/263 |
| 3,879,574 | 4/1975 | Filreit et al. | 264/272 |
| 3,944,183 | 3/1976 | Miller | 264/272 |
| 3,975,479 | 8/1976 | McClean | 264/257 |
| 4,061,522 | 12/1977 | Bauerkemper | 264/263 |
| 4,105,731 | 8/1978 | Yamazaki | 264/263 |
| 4,138,460 | 2/1979 | Tigner | 264/263 |

FOREIGN PATENT DOCUMENTS 724478 12/1965 Canada ................... 264/257

Primary Examiner—James B. Lowe
Attorney, Agent, or Firm—Allen D. Gutchess, Jr.

[57] ABSTRACT

A fiber-reinforced product or article and a method and apparatus for producing same are provided. For producing the product, a mold of the size and shape of the desired product has reinforcing fibers positioned therein, substantially in a form in which they will exist in the final product. Means are also located in the mold for forming channels in communication with the fibers to facilitate the flow of resin through the length of the mold and into the fibers. The channels greatly increase the rate of penetration of the resin into spaces between the fibers, particularly for elongate products of substantial length and limited transverse cross section. The channels also facilitate evacuation of air from the mold and aid in the escape of air dissolved in the resin which precedes the resin as the resin flows into the mold.

8 Claims, 4 Drawing Figures

METHOD FOR PRODUCING FIBER REINFORCED PRODUCT

This invention relates to fiber-reinforced resinous articles and to a method and apparatus for producing same.

Fiber-reinforced resinous articles are sometimes made by vacuum molding. Fibers are positioned in the mold in the desired shape and position in which they will exist in the final reinforced product. One end of the mold is then evacuated and resin is supplied from the other or the vacuum pump may be sealed off and resin supplied from the same end. The impregnation of the resin into the fibrous reinforcement has been slow, particularly for long articles or products of relatively narrow transverse cross section. The resin also may not penetrate between the fibers uniformly due to channelization and due to trapped air that was not evacuated from the mold or that was dissolved in the resin. However, if the average pressure in the mold is 1 mm Hg (1.0 Torr) the advancing resin will compress the residual air until pressure equalizes, with the pressure forcing the resin into the mold. This may create a void or air pocket in the mold, the size of which will be equal to only 1/760 of the original volume of the air space in the mold (assuming that atmospheric pressure—760 Torr—is used to pressurize the resin). In contrast, with pressure molding, if an air void at atmospheric pressure has a volume of one cubic mm, at 1500 psi it will be reduced to 1/100 of its original volume (1500/15), compared to 1/760 with vacuum molding. Also, in pressure molding, the air voids are reduced by the high pressure which diminishes the air pockets (voids). With a vacuum molding, the air is substantially removed in the first place so that minimal air voids will occur. Another advantage of vacuum molding (as compared to pressure molding) is that relatively lightweight, inexpensive molds can be used.

In accordance with the invention, channels or pathways for the resin are formed within the mold and in communication, preferably throughout their length, with the fiber reinforcement placed therein prior to molding. The channels preferably extend throughout the length of the mold, from a location where the resin is supplied to a location where the vacuum is established. Thus, the channels extend generally parallel to the direction the resin would move even if there were no channels present.

The channels facilitate uniform and thorough impregnation of the resin in the fibrous reinforcement. They also greatly increase the rate of penetration into the fibers over the length of the mold by enabling rapid flow through the mold, with the distance that the resin must move through the fine interstices between the fibers being greatly shortened. The size of the channels is important, depending on the viscosity of the resins used in molding. The channels should preferably have a diameter of at least one-eighth inch or an equivalent cross section area. The channels also facilitate the evacuation of air from the mold and provide escape for any air dissolved in the resin entering the mold. Further, the means forming the channels provide, in many instances, structural support for the fibrous reinforcement in the mold to maintain it in place.

The channels also cause any residual air to be broken up into several small voids, rather than a few large voids. The resin moves swiftly down the channels during the beginning of impregnation. This traps the residual air into several small pockets rather than compresses it into one (or a few) larger pockets. The residual air is thus broken up and is less damaging or visible.

The resin preferably is first subjected to a vacuum or evacuated to remove any entrapped or dissolved air prior to being supplied to the mold. The resin is also preferably supplied to the evacuated mold under positive pressure, by a piston pump, for example.

It is, therefore, a principal object of the invention to increase the rate of impregnation of reinforcing fibers by resin in a vacuum molding process.

Another object of the invention is to provide vacuum molding apparatus in which reinforcing fibers are positioned in a mold and channels are formed in the mold in communication with the fibers to facilitate penetration of resin into the fibrous layer.

A further object of the invention is to provide a fiber-reinforced article in which channels are formed throughout the length thereof with resin being located in the channels.

Yet another object of the invention is to provide vacuum molding apparatus in which channels are provided in a fibrous reinforcement in a mold to cause the entering resin to trap residual air in small pockets.

Many other objects and advantages of the invention will be apparent from the following detailed description of preferred embodiments thereof, reference being made to the accompanying drawings, in which.

Figure 2:
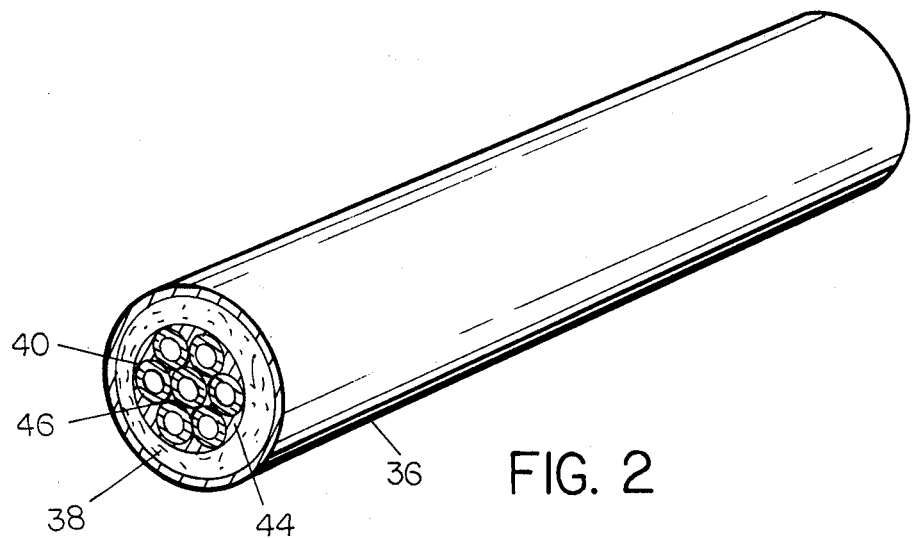
FIG. 2 is a view in perspective with a portion shown in transverse cross section of a mold and a product or article made with the apparatus of FIG. 1.
Figure 1:
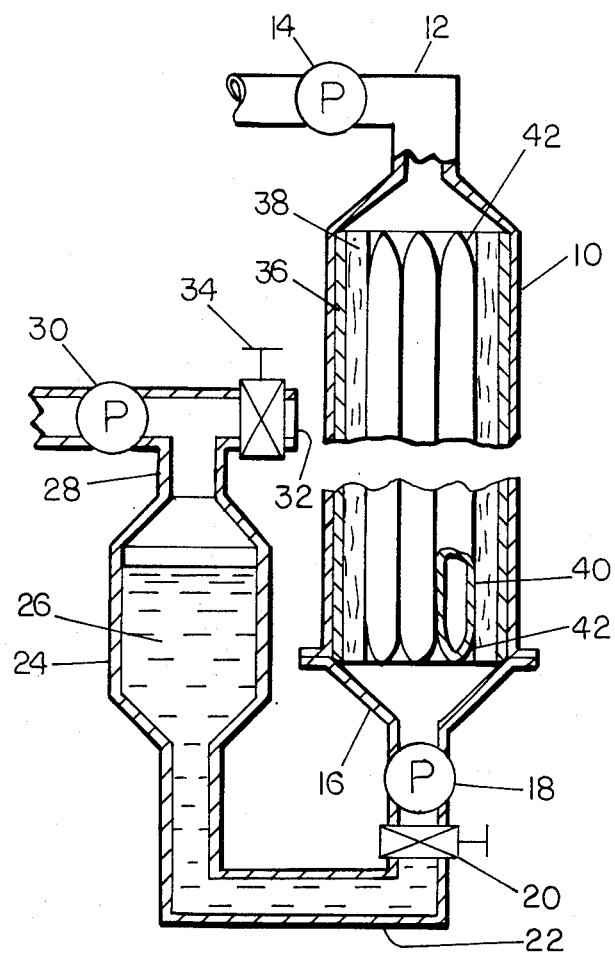
FIG. 1 is a schematic view in vertical cross section of apparatus for producing a fiber-reinforced product in accordance with the invention.

Referring particularly to FIGS. 1 and 2, an elongate vacuum chamber 10 has an evacuation line 12 connected to a vacuum pump 14. The opposite end of the vacuum chamber 10 has a supply line 16 communicating with a piston pump 18. Below the pump 18 is a control valve 20 in a line 22 communicating with a source 24 of resin 26. Above the resin 26 is a vacuum line 28 communicating with a vacuum pump 30 and also with a vent 32 having a valve 34.

A mold 36 is located within the vacuum chamber 10 and is contiguous with the inner surface of the chamber, in this instance. The mold can be of various materials, with silicone rubber being suitable, particularly where intricate details are required for a product's surface. A layer 38 of reinforcing fibers is located within the mold and, in this instance, is located contiguous with the inner surface of the mold 38 to provide reinforcement for resin at the surface of the product where the reinforcement may be the most effective. The fibers of the reinforcing layers can be of a variety of materials with glass fibers in the form of continuous filaments or chopped strands being highly suitable.

When the resin must penetrate the reinforcing fiber layer from one end of the mold to the other, the penetration can be very slow, particularly for elongate products and those of smaller transverse cross section. Further, the resin may not penetrate the fibrous layer uniformly due to channelization and due to trapped air that was not evacuated from the mold or dissolved in the resin.

To overcome the above problems, the invention provides channels or pathways through the mold through which the resin can flow into the fibrous layer or layers. The channels preferably extend throughout the length of the mold from the end where the resin is supplied to the end where the vacuum is established. In this instance, the channels are formed by a plurality of elongate members 40 which are hollow and have closed ends 42. Of course, solid members could be employed, particularly where more strength might be required in the product, but the hollow members are lighter, of course, to produce a lighter weight product, where additional strength is not a factor. Other core materials include polyethylene moldings, extruded foams, and wood forms.

The elongate members 40 themselves do not form the channels, but channels 44 and 46 are formed among the interstices. The channels 44 are located between the outer members 40 and the inner surface of the fibrous layer 38. The channels 46 are formed in interstices between the outer elongate members 40 and the center one. The outer channels 44 have the larger cross section so that most of the resin flows through these channels where it is in constant communication with the fibrous layer 38.

Solely by way of illustration, the product or article to be produced in the mold 36 can have an outer diameter of two and one-eighth inches with the fibrous layer 38 being one-eighth inch thick. Each of the seven elongate members 40 is made of a polyethylene tube sealed at the ends and has a five-eighths inch outer diameter and a wall thickness of 0.062 inch. The area defined by the inner surface of the fibrous layer 38 has a transverse cross section of 2.76 square inches, with the members 40 having a transverse cross section of 2.15 square inches. Hence, the open area defined by the layer 38 is only 22.2%, with the elongate members in position, of what the full area would be. Thus, the amount of resin is substantially less than it would be if the tubes were not used. Further, the tubes direct the resin to the outside where it is the most effective. The cores not only increase the speed of the molding process, but contribute to the product in that cost is reduced by the use of less resin and by reducing the product's weight. The elongate members 40, are also instrumental in holding the fibrous layer 38 in proper position during the molding process.

In the above example, assuming the density of the resin to be 0.05 lbs/cu. in., the fibrous layer to be 0.065 lbs/cu. in., and the tubes to be 0.034 lbs/cu. in., the final product has a density of 55.5 lbs/cu. ft.

In the operation of the apparatus of FIG. 1, the vacuum chamber 10 is opened and the mold 36, the fibrous layer 38, and the elongate members 40 are positioned therein with the members and layers preferably being positioned in the mold first. With the valve 20 closed, and the piston pump 18 not operating, the vacuum pump 14 is operated to evacuate the chamber 10. With the vent valve 34 closed, the vacuum pump 30 is also operated to evacuate the supply source 24 above the resin 26 so as to remove any air entrapped or dissolved therein. The piston pump 18 is then operated and the control valve 20 and the vent valve 34 are opened to supply the resin 26 upwardly through the mold 36 under pressure supplied by the piston pump 18. The resin 26 travels through the channels 44 and 46 with most flowing through the channels 44 and into the fibrous layer 30 which is in communication with the channels 44 throughout the length. Any air remaining in the resin will not be of consequence with this arrangement, since any small bubbles will be even more minute when in the mold under pressure. For example, if the resin source is evacuated at a pressure of 5 mm Hg, a bubble that has a diameter of 1 mm in the resin 26 at the source 24 will only have a calculated diameter, assuming perfect gases, of only 0.187 mm in the mold.

Figure 3:
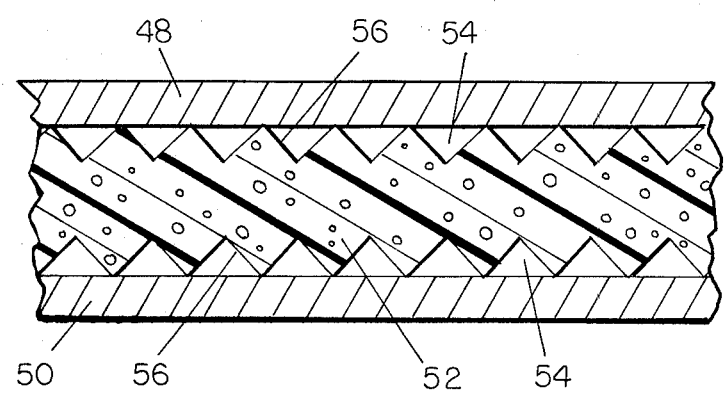
FIG. 3 is a fragmentary view in transverse cross section of other product components, prior to being impregnated with resin, according to the invention.
Figure 4:
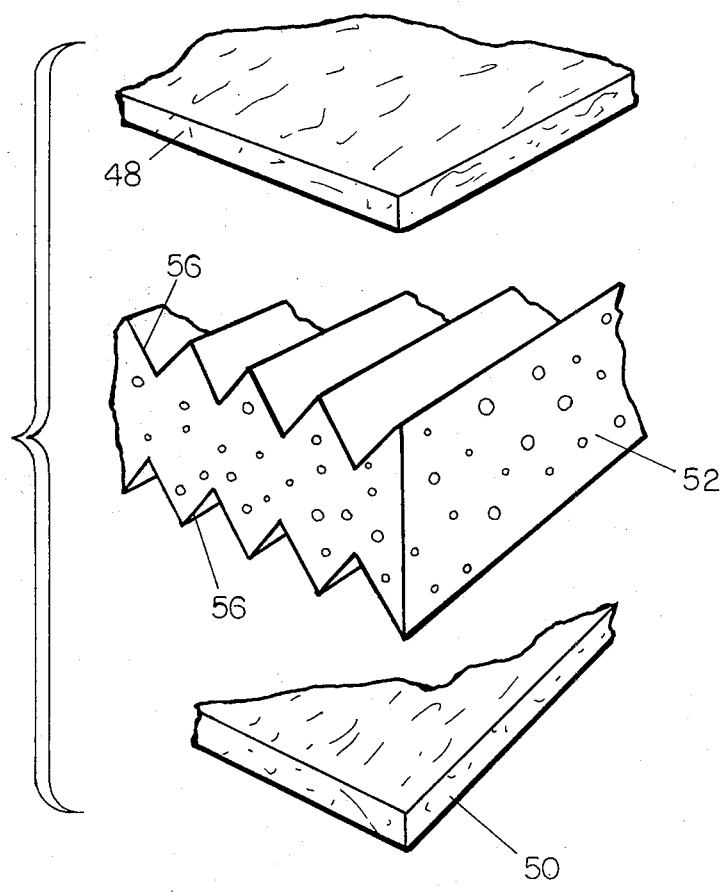
FIG. 4 is a fragmentary exploded view in perspective of the components shown in FIG. 3.

Another arrangement for providing channels throughout the mold and in communication with fibrous reinforcing material is shown in FIGS. 3 and 4. In this instance, the product is in the nature of a long flat body having parallel, planar surfaces, such as a tabletop. The product has two reinforced fiber mats or layers 48 and 50 which again will be at the outer surfaces of the product. In this instance, the channels or pathways are formed by a grooved body 52. The body 52 can be made of a variety of materials with a closed-cell, plastic foam material being suitable since it is relatively inexpensive and light in weight. The body 52 forms a plurality of channels or pathways 54 by grooves 56 formed in the surface of the body and extending the length thereof. The body is placed in a mold so that the grooves 56 extend from a resin supply through the mold to the evacuated end thereof, parallel to the direction of flow the resin would ordinarily take without the grooves.

The channels 54, like the channels 44 of FIG. 2, are in constant communication with the interior surfaces of the mats 48 and 50 throughout their length to provide effective communication therebetween and rapid penetration of the resin into the fibrous layers. In both instances, the means forming the channels, namely the elongate members 40 and the body 52, have only line contact with the layers 38, 48, and 50 so that minimum interference between channel-forming means and the fibrous layers is achieved.

It is to be clearly understood that the two channel-forming means shown in the drawings are only illustrations of the invention and that the channels can be formed by a variety of means and materials to suit the particular configuration of the product to be made. For example, coarse granular material could be used to form the channels, in which case the channels would be zig-zag rather than straight. The granular material could be plastic or glass spheres which could be either solid or hollow. Various other shapes, such as loose packing material, could also be employed.

Products which can be made in accordance with the invention include such items as chair legs, table legs, bed rails, and various posts. Particularly with the structure of FIGS. 3 and 4, larger board-like members can be made, such as tabletops.

Various modifications of the above-described embodiments of the invention will be apparent to those skilled in the art, and it is to be understood that such modifications can be made without departing from the scope of the invention, if they are within the spirit and the tenor of the accompanying claims.

I claim:

1. A method of making a fiber-reinforced plastic article which comprises forming at least one layer of reinforcing fibers in a shape defining a space, placing channel-forming means within the space with channels generally parallel and extending substantially over the length of the fibrous layer and in communication therewith, placing the combination channel-forming means and layer in a mold to completely fill the cross-sectional area of the mold, with the channel-forming means spaced inwardly from the inner surface of the mold but communicating with at least one end thereof, evacuating the mold, subsequently supplying plastic material to the mold whereby the plastic material will flow through the channels and into the fibrous layer in communication therewith, removing the impregnated combination of fibers and channel-forming means from the mold, and retaining the channel-forming means with the impregnated fiber layer as part of the finished article.

2. A method according to claim 1 characterized by supplying the plastic material to the mold under a positive pressure.

3. A method of making a fiber-reinforced plastic article which comprises shaping a layer of randomly-disposed fibers to be impregnated with plastic material, forming a plurality of internal channels of predetermined shape in communication with the fiber layer and extending substantially over the length thereof with the channels being spaced inwardly from the external surface of the fiber layer by placing channel-forming means in communication with the fiber layer, placing the combination in a mold with the channels and the fiber layer in communication with at least one end of the mold, evacuating the mold by forming a vacuum in communication with an end thereof, supplying plastic material under positive pressure to an end of the mold to cause the plastic material to flow through the channels and into the layer of fibers, and retaining the channel-forming means and layer of fibers as part of the finished article.

4. A method according to claim 3 characterized by forming the plurality of channels in communication with the fiber layer by placing a body with a plurality of grooves in a surface thereof in contact with the fiber layer, with the grooves communicating with the fiber layer.

5. A method according to claim 4 characterized by placing the body with portions between the grooves in line contact with the inner surface of the fiber layer.

6. A method according to claim 3 characterized by forming the plurality of channels in communication with the fiber layer by placing a plurality of hollow, rod-like elements in contact with the fiber layer and extending substantially over the length thereof.

7. A method according to claim 6 characterized further by placing some of said rod-like elements in line contact with the inner surface of the fiber layer.

8. A method of making a fiber-reinforced plastic article which comprises forming a layer of fibers to be impregnated with plastic material, forming a plurality of channels in communication with the fiber layer and extending substantially over the length thereof with the channels being spaced inwardly from the external surface of the fiber layer by placing channel-forming means in communication with the fiber layer, placing the combination in a mold with the channels and the fiber layer in communication with opposite ends of the mold, evacuating the mold by forming a vacuum in communication with one end thereof, supplying plastic material under positive pressure to the mold at the opposite end thereof to cause the plastic material to flow thhough the channels toward said one end of said mold and into the layer of fibers, and retaining the channel-forming means and layer of fibers as part of the finished article.

* * * * *